United States Patent Office 2,945,570
Patented July 19, 1960

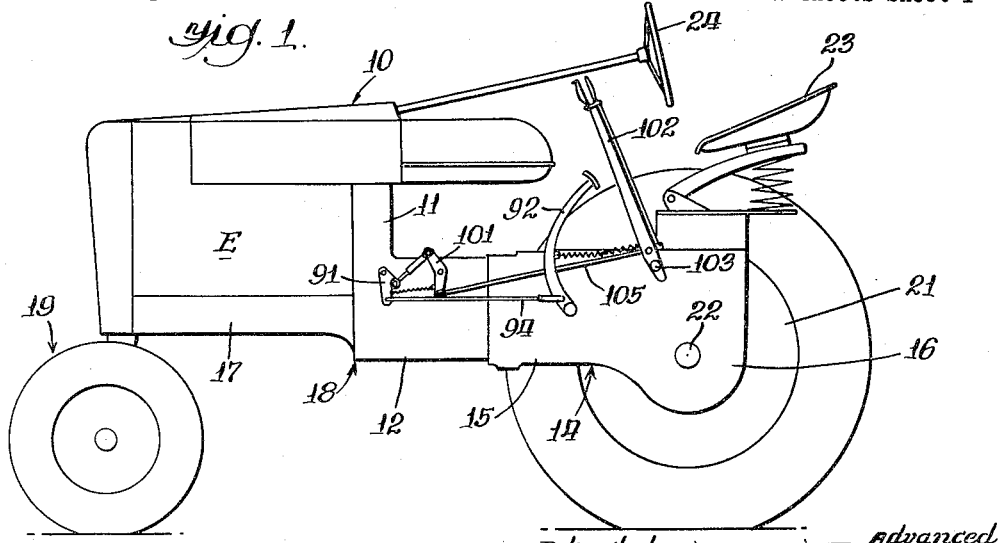
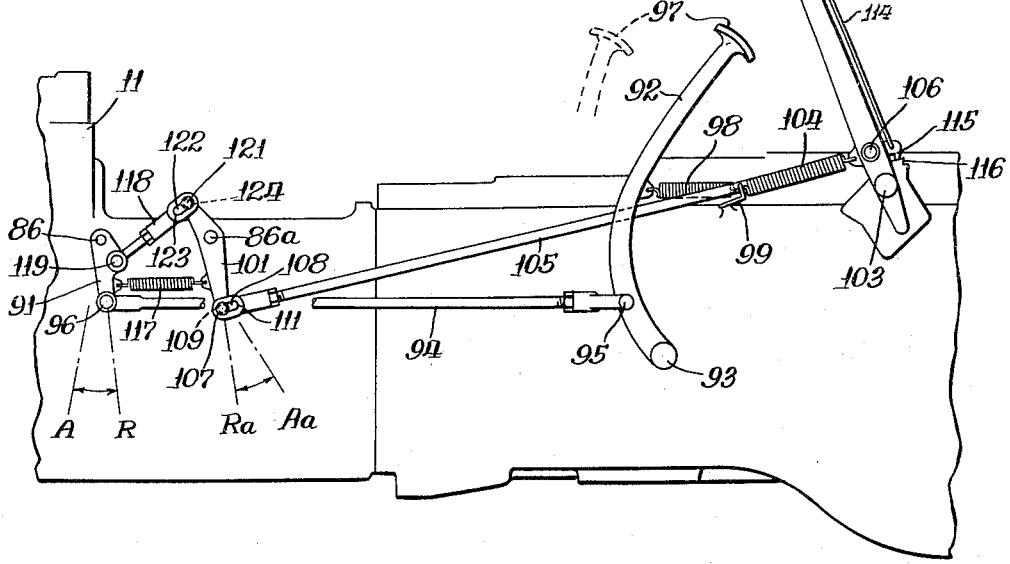

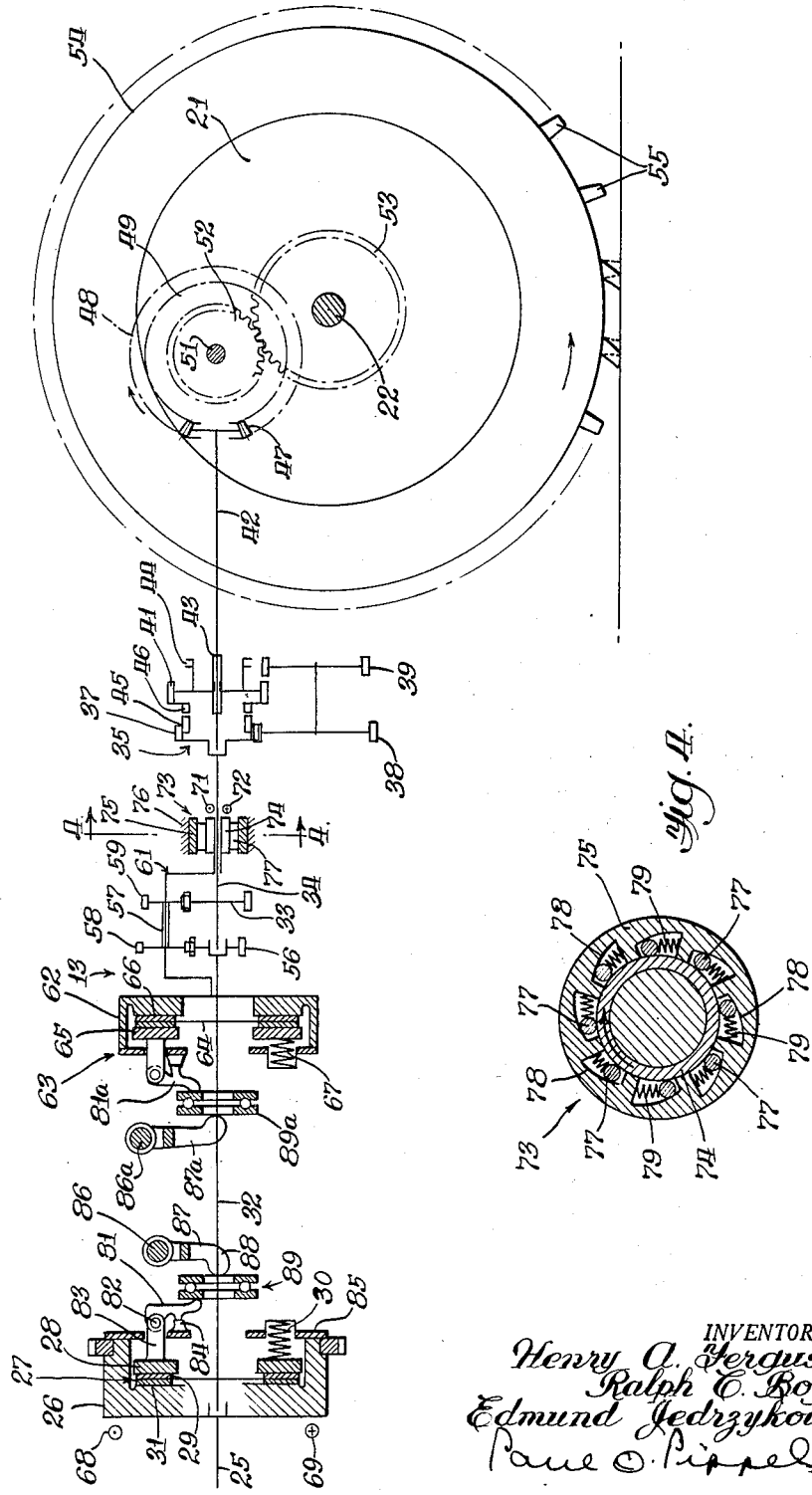

2,945,570

INTERCONNECTED MAIN CLUTCH CONTROL AND PLANETARY GEAR LOCK-UP RELEASE FOR RELIEVING REACTIVE FORCE IN A CHANGE-SPEED POWER TRANSMISSION TRAIN

Henry A. Ferguson, Lombard, and Ralph C. Boyle and Edmund Jedrzykowski, Chicago, Ill., assignors to International Harvester Company, a corporation of New Jersey Filed Aug. 17, 1953, Ser. No. 374,684

7 Claims. (Cl. 192—3.6)

This invention relates to change-speed power transmitting mechanism drivable from a vehicle engine through a main clutch and including a torque reactive force train through which demeshable torque transmitting elements are reactable against the vehicle frame upon release of the main clutch, and more particularly concerns means operable attendant to release of the main clutch to disrupt the reactive force train to preclude pressure between the demeshable elements that would significantly resist the demeshing thereof.

There has been developed for a tractor vehicle, a torque amplifying transmission unit interposed between the engine and a change-speed gearing unit which is drivingly connected with the traction wheels or other species of ground-engaging propelling means of such vehicle. This torque amplifying unit includes planetary gearing wherein there is a driving member connected with the engine through a main vehicle clutch, a driven member coaxial with the driving member and drivingly connected with the change-speed transmission unit, and a torque reaction member reactable through an overrunning brake against a portion of the vehicle frame for causing the torque amplifying unit to drive the driven member at an increased torque and at an under-speed with respect to the driving member. The torque amplifying unit also includes a lock-up clutch releasably engageable for connecting two of the planetary gearing members together when locking up the planetary gearing for causing the driven member to be driven at the same speed as the driving member. During this lock-up operation of the planetary gearing the overrunning character of the brake permits the torque reaction member of the planetary gearing to overrun or rotate in one direction relatively to the casing or frame. The change-speed transmission unit includes meshed elements which are demeshable for disengaging a driving train through this transmission pursuant to shifting speeds or changing from this power train to another power train of different speed transmitting ratio. As in conventional vehicles, these demeshable elements are to be relieved of torque pressure by disconnecting the main engine clutch attendant to the demeshing operation. Unless the torsional force pressure between the demeshable elements is relieved or diminished, it is difficult to demesh them. However, in power transmitting mechanism of the type herein involved employing the planetary gearing torque amplifier unit in driving relation with the change-speed gearing unit, disengagement of the main clutch, while the planetary gearing unit is locked up, causes a condition to prevail wherein there is a tendency to rotate the driving element of the demeshable elements backwardly, and, since the planetary gearing unit is locked up the overrunning brake reacts against the tractor frame or casing to prevent this retrograde rotation wherefore the torsional pressure between the demeshable elements is not sufficiently diminished to facilitate demeshing thereof. The force tending to rotate the meshed elements and the locked-up planetary gearing unit reversely following disengagement of the main clutch originates in the "wound up" or slightly sprung resilient series of elements in the connected power train of the change-speed transmission and in the series of elements in the driving train between the tail shaft of the transmission and ground-engaging portions of the traction propelling means. When the traction propelling means constitutes rubber tires with rubber tread lugs having considerable extent radially of such tires, the deflection of these lugs tangentially of the tire supplements the "wound up" effect of the other serially arranged elements in the connected power train, thereby enabling the force tending to rotate the meshing elements reversely to prevail during a significant distance of such reverse rotation, causing the one-way brake to become effective to prevent further reverse rotation before the energy of such force is dissipated.

The principal object of this invention is the provision of means operable under control of the operating means for the main vehicle clutch to disrupt the reactive force train, including the one-way brake through which the demeshable torque-transmitting elements react upon the vehicle frame, attendant to disengagement of the main clutch whereby torsional force will be released from the demeshable elements and facilitate demeshing thereof in a normal manner while the main clutch is disengaged.

A more specific object of this invention is the provision of an interlock linkage between the main clutch operating means and operating means for the lock-up clutch and including a lost motion connection which enables the main clutch linkage to be effective through such interlock linkage for disengaging the lock-up clutch and thereby disrupt the force-reaction train of the planetary gearing unit pursuant to disengagement of the main clutch, and the lost motion connection having the further function of enabling operation of the operating means for the lock-up clutch to disengage this clutch without effecting disengagement of the main clutch. Such independent operation of the lock-up clutch to enable its disengagement without disengagement of the main clutch enables the torque amplifier unit to be operated in selective speed connections while being driven through the main clutch.

These and other objects inherent in and encompassed by the present invention are elucidated in the ensuing description, the appended claims, and the annexed drawings, wherein:

Fig. 1 is a side elevational view of a farm tractor vehicle having a preferred embodiment of the present invention assembled therewith.

Fig. 2 is a fragmentary enlarged side elevational view showing a mid-body or frame section of the tractor shown in Fig. 1 and linkages constructed according to this invention for controlling power transmission mechanism contained within the tractor body or frame.

Fig. 3 is a diagrammatic view illustrating the power transmitting mechanism between the engine crankshaft and ground-engaging propelling means for the vehicle, and operable under control of the linkages shown in Figs. 1 and 2.

Fig. 4 is an enlarged sectional view taken on the line 4—4 of Fig. 3 and illustrating an overrunning brake employed in the power transmitting mechanism.

The invention is illustrated in conjunction with a farm type tractor 10, Fig. 1, having an engine E rigidly connected at its rear or right end with the front end of a bell housing portion 11 of a casing 12 for an auxiliary plural speed power transmission unit designated 13 in Fig. 3. The rear end of the casing 12 is rigidly connected with the front end of a tractor frame casing structure 14 which has a change speed transmission containing portion 15 and a rear axle housing portion 16. The casings 12 and 14 and the engine side sill members 17 (one being shown in Fig. 1) collectively constitute the vehicle frame 18 upon which the engine E is mounted. The front end of the frame is supported upon a steering truck 19 and the rear part of the frame is supported conventionally upon laterally spaced traction wheels 21 at opposite sides of the frame and respectively constrained for rotation with oppositely extending driving axles 22, one of which is shown in Fig. 1. A driver's seat 23 supports a tractor operator accessible to a steering wheel 24 operably connected with the steering truck 19 and also accessible to other controls for the vehicle.

Referring now to Fig. 3, a crankshaft 25 of the engine E has the usual flywheel 26 constrained for rotation therewith. Associated with this flywheel is a main friction clutch 27 of conventional structure which includes an annular pressure plate 28 normally held by a circle of springs 30 in a forward position to frictionally grip a driven disk 29 of this clutch between the pressure plate and an annular friction surface 31 on the flywheel. During engagement of the main clutch 27 power is transmittable from the engine crankshaft through this clutch to a clutch-driven shaft 32 which operates an auxiliary plural speed power transmission or torque amplifier unit in the form of the planetary gearing unit 13. A driven gear member 33 of the planetary gearing unit 13 is thus rotated and operable through a shaft 34 for rotating a combined gear and dental clutch member 35 of a change-speed gearing unit 36 of the countershaft type. A gear component 37 of the member 35 meshes with and drives a countershaft gear 38 with which a countershaft gear 39 is constrained for rotation. A gear 41 splined to the transmission tailshaft 42 at 43 is shown in a neutral position. When the gear 41 is slid rearwardly upon the connection 43 by means of a shifter fork (not shown) conventionally connected with the gear 41 by means of a shifter fork groove 44, this gear 41 is carried into mesh with the gear 39 so that the shaft 42 will be driven through the gears 37, 38, 39, and 41 at a reduced speed with respect to the shaft 34. Shifting of the gear 41 forwardly from the position shown in Fig. 3 will mesh dental clutch elements 45 and 46 which are respectively constrained for rotation with the gears 37 and 41. This establishes a direct connection between the shafts 34 and 42 causing them to rotate in unison.

Irrespective of whether the transmission tailshaft 42 is directively coupled with the shaft 34 through the selectively meshable and demeshable elements 45 and 46 or connected with the shaft 34 through the countershaft speed-reduction connection including the countershaft gears 38 and 39, a bevel pinion 47 which is constrained for rotation with the shaft 42 rotates a bevel gear 48 meshed therewith and thus rotates a differential unit 49 upon which the gear 48 is mounted. The differential unit 49 conventionally differentially drives oppositely extending shafts 51 of which one is shown in Fig. 3. Each differentially driven shaft 51 has a gear 52 constrained for rotation therewith and meshing with a gear 53 with which axle shaft 22 is constrained for rotation. The wheels 21 are shown with inflated rubber tires 54 having radially projection traction lugs 55.

The planetary gearing unit 13 comprises a rotatable driving member 56 in the form of a sun gear constrained for rotation with the main clutch driven shaft 32, a coaxial driven member in the form of the sun gear 33, a plurality of planet gear clusters 57, each comprising a planet gear 58 meshed with the driving gear 56 and a planet gear 59 meshed with the driven gear 33. These gear clusters 57 are rotatively mounted upon a torque reaction member 61 in the form of a planetary gear carrier which is adapted to rotate coaxially with the shafts 32 and 34. The forward end of the torque reaction member 61 has one member 62 of a planetary gearing unit lock-up clutch 63 constrained for rotation therewith. This clutch 63 may be of a conventional friction type and has a friction disk member 64 normally gripped between a pressure plate 65 and an annular friction surface 66 on the member 62 by the force of a circle of compression springs 67. During engagement of the lock-up clutch 63, the torque reaction member 61 is constrained for rotation with the driving member 56, thereby locking up the planetary gearing unit 13 so it rotates as a unit in unison with the shafts 32 and 34. This rotation is clockwise as viewed from the front or left end of Fig. 3. This direction of rotation is indicated by the arrowhead 68 and the arrowtail 69 associated with the flywheel 26. This direction of rotation is also indicated by the arrowhead 71 and the arrowtail 72 associated with the shaft 34 connected between the planetary gearing unit 13 and the change-speed gearing unit 36. This clockwise direction of rotation is facilitated by an overrunning or one-way brake device 73 having a cylindrical ring 74 constrained for rotation with the torque reaction member 61, a cam ring 75 arranged concentrically with the ring 74 and mounted in a portion 76 of the tractor frame 18, and a plurality of overrunning brake rollers 77. In Fig. 4 the various elements of the overrunning brake 73 are shown, including cam profiles 78 inclined with respect to respective portions of the outer periphery of the ring 74 in radially opposed relation thereto, and springs 79 reacting between the ring 75 and the rollers 77 to urge them into wedging relation between the cam profiles and the outer periphery of the ring 74. This wedging of the rollers 77 offers no significant resistance to rotation of the ring 74 in the direction indicated by the arrow in Fig. 4, and the arrow symbols 71 and 72 in Fig. 3, but reacts the ring 74 against the casing or frame portion 76 to prevent retrograde rotation of this ring.

The main clutch 27 is disengageable against the force of the springs 30 incident to forward movement of the radially inner ends of clutch throw-out levers 81 (one beings shown) which are pivotally connected at 82 to rearward projections 83 of the annular pressure plate 28. During this forward movement of the radially inner ends of the levers 81 they pivot upon fulcrum members 84 respectively associated therewith upon the clutch back-plate 85. Such forward movement of the radially inner ends of the throw-out levers 81 is effected by clockwise rocking of a shifter fork shaft 86 and a shifter fork 87, of which furcations 88 move a throw-out bearing unit 89 against such ends of the throw-out levers 81. Thus, the shifter fork 87 and its associated parts constitute means selectively operable to release or disengage the main friction clutch 27.

The clutch operating shaft 86 extends exteriorly of the tubular vehicle frame 18 where an end portion is visible in Fig. 2. A pivotal main clutch operating lever 91 is secured to this exterior portion of the shaft 86 with which it is constrained for rotation. A clutch releasing lever in the form of a pedal 92 is pivotally mounted at 93 upon the tractor frame and is connected with the lever 91 by a main clutch operating linkage constituting a link 94 pivotally connected to the pedal 92 at 95 and pivotally connected with the lower end of the lever 91 at 96. The vehicle operator, by pressing forwardly upon the pad 97 of the pedal 92, can exert a thrust force through the link 94 to pivot the lever 91 from a normally retracted position R to an advanced position A for rocking the shaft 86 and the shifter fork 87, Fig. 3, sufficiently clockwise for disengaging the main clutch 27. When it is desired for the main clutch to become engaged, the operator releases the pedal 92 whereupon the springs 30 associated with the main clutch and a helical spring 98 connected between the pedal 92 and a bracket 99 on the tractor frame complementally return the pedal 92 and the parts connecting the same with the clutch throw-out levers 81 to the retracted positions illustrated in Figs. 2 and 3.

The planetary gearing lock-up clutch 63 is engaged and disengaged similarly to the main clutch 27, there being throw-out levers 81a corresponding to the levers 81, a throw-out bearing 89a corresponding to the throw-out bearing 89, a clutch throw-out fork 87a corresponding to the throw-out fork 87 and a clutch-operating shaft 86a corresponding to the shaft 86 and of which an exterior end portion is visible in Fig. 2. A pivotal lock-up clutch operating lever 101 is constrained for rotation with the exterior portion of the shaft 86a. Pivotal movement of the lever 101 from the normally retracted position Ra to the advanced position Aa causes rearward movement of the clutch throw-out bearing 89a sufficiently far to operate the clutch throw-out levers 81a for disengaging the clutch 63. A manually operated lock-up clutch control lever 102 piovtally connected at 103 to the tractor frame is normally in the retracted full-line position, shown in Fig. 2, where it is urged by a helical spring 104 connected between this lever and the tractor-mounted bracket 99. Lock-up clutch operating linkage in the form of a link 105 is pivotally connected at 106 to the lever 102 and is pivotally connected with the lower end of the lever 101 by a pin 107 mounted within the lever 101 and an elongated slot 108 in the forward end of the link 105. The pin 107 is free to slide lengthwise of the link 105 between extremities 109 and 111 of the slot 108. Thus the pin 107 in addition to accommodating pivotal movement between the link 105 and the lever 101 also constitutes one element of a lost motion connection 107—108 between the parts 101 and 105.

The operator by engaging a handle 112 of the lock-up clutch control lever 102 can conveniently and quickly pivot this lever clockwise from the retracted position shown in full lines to the advanced position shown in broken lines. In thus pivoting the control lever 102 the link 105 will be moved endwise rearwardly to pivot the lever 101 from the retracted position Ra to the advanced position Aa for disengaging the lock-up clutch 63. When the lock-up clutch 63 is disengaged while power is transmitted through the main clutch 27 to rotate the planetary gearing driving gear member 56 clockwise as viewed from the left in Fig. 3, the planetary gear clusters 57 are caused to rotate counterclockwise about their individual axes and thus tend to roll counterclockwise about the toothed periphery of the driven gear member 33. However, since the torque-reaction member or planetary gear carrier 61 is constrained by the one-way brake device 73 against counterclockwise rotation, the counterclockwise rotation of the cluster gears 59 meshing with the gear member 33 will cause this member to rotate clockwise. Due to the difference in diameters of the gears 56, 58, 59, and 33, this clockwise rotation of the gear 33 will be at a slower speed than that of the gear 56. Assuming that the change-speed gearing unit 36 is adjusted to establish a power-transmitting train therethrough to the beveled pinion 47, the traction wheels 21 of the vehicle will be rotated in the direction indicated by the arrow associated with the tire 54. The clutch 63 will be disengaged to establish this speed reduction or torque amplifying driving connection through the planetary gearing unit 13 during periods when abnormal driving torque is required to cause forward moving of the vehicle. As soon as this exigency no longer prevails, the tractor operator will grasp the control lever handle 112 incident to gripping the detent release lever 113 to pivot the same and lift upwardly on a rod 114 for releasing a detent latch 115 from a catch shoulder 116 which had held the lever 102 in the advanced or torque-amplifying position shown by broken lines. Thereupon the lever 102 is allowed to move forwardly under the force of the spring 104 and also under the force of spring 117 (connected between clutch-operating levers 91 and 101) and under the force of the lock-up clutch springs 67 to permit re-engagement of the lock-up clutch 63 whereupon the torque-amplifier planetary gearing unit 13 will be locked up to transmit drive therethrough at one-to-one ratio without torque amplification.

Considering now the condition that prevails in the power transmitting mechanism while both clutches 27 and 63 are engaged as well as the rotatable torsional force-transmitting dental clutch elements 45 and 46, rotation of the engine crankshaft clockwise, as viewed from the left end in Fig. 3, will impart similar or forward rotation through the clutch 27 and the lock-up planetary gearing unit 13 through the shaft 34, the driving element 45 of the demeshable torque-transmitting elements 45 and 46. This forward rotation of the torque-transmitting element 45 will impart like rotation to the torque element 46 meshed therewith and to the shaft 42, and to the bevel pinion 47. The gear 48, differential unit 49, gears 52 and 53, axle shafts 22, and wheels 21, will thereby be caused to rotate the tires 54 in the forward direction indicated by the arrow associated with the tire in Fig. 3. Resistance to forward motion of the vehicle by a load (not shown) attached thereto will cause the resultant tire lugs 55, in contact with the ground surface, to deflect from their dotted line positions to their full line positions. If at this time the operator should decide to change the speed connection in the change-speed gearing 36, he would normally depress the main clutch pedal 92 for disengaging the main clutch 27 prior to demeshing the relatively rotatable torsional force-transmitting elements 45 and 46. One purpose of disengaging the main clutch 27 prior to demeshing the elements 45 and 46 is to release the torsional pressure between the teeth of these elements so it is possible to slide them out of mesh with ease. However, the side pressure between the teeth of the elements 45 and 46 would not be released in the present power transmission mechanism by releasing the main clutch 27 unless the planetary gearing lock-up clutch 63 is also released. Assuming that the clutch 27 is released while the clutch 63 remains engaged, the distorted tire lugs 55 in contact with the ground would tend to rotate the wheels 21 clockwise (opposite to the direction of the arrow associated with the tire 54 in Fig. 3) about the axes of axles 22 which would tend to rotate the shafts 42 and 34 and the locked-up planetary gearing unit 13 counterclockwise, as viewed from the left end in Fig. 3. However, such counterclockwise rotation is prevented by the overrunning brake device 73 and therefore the resilient "wind up" provided by the distorted tire lugs 55 and the accumulated resilient deformation in the concatenation of serially connected parts between the planetary carrier 61 and the traction wheels 21 would maintain substantial side thrust between teeth of the demeshable elements 45 and 46 whereby their demeshing is difficult. While this condition exists, the shaft 34, sun gears 33 and 56, planet gear clusters 57, the lock-up clutch 63 and the torque reaction member or carrier 61 constitute a reactive force train between the driving element 45 of the normally demeshable relatively rotatable torsional force-transmitting elements 45 and 46 whereby this driving element 45 is prevented from retrograde rotation far enough that would release the pressure between the teeth of the elements 45 and 46. Inasmuch as this reactive force train includes the lock-up clutch 63, such train is disruptable by disengagement of the clutch 63 whereupon the driving element 45 can rock in the retrograde direction for releasing the pressure between the elements 45 and 46.

The present invention involves an interlock linkage comprising a link 118, Fig. 2, pivotally connected at 119 with the main clutch-operating lever 91 and pivotally connected with the upper end of the lock-up clutch operating lever 101 by a pin 121 mounted in such lever and an elongated slot 122 in the rear end of the link 118. The pin 121 is slidable within the slot 122 between its extremities 123 and 124 whereby the slot 122 and the pin 121 constitute a lost-motion connection between the link 118 and the lever 101. While the lock-up clutch control lever 102 is in the forward direct drive position illustrated in Fig. 2, the lock-up clutch 63 will be engaged and the operating lever 101, Fig. 2, for this clutch will be in the retracted position Ra. Therefore, when the main clutch operating pedal 92 is depressed by the operator preparatory to demeshing the elements 45 and 46 of the change-speed transmission unit 36, the clockwise pivoting of the lever 91 in pulling the interlock link 118 forwardly will be operable through the connection 121—122 for pivoting the lock-up clutch operating lever 101 counterclockwise to simultaneously disengage the lock-up clutch 63, thereby disrupting the disruptable reactive force train between the driving demeshable element 45 and that portion of the vehicle frame 76 against which the one-way brake 73 reacts, whereby retrograde rotational movement of the element 45 is possible to release the side pressure between the teeth of elements 45 and 46 to facilitate their being demeshed. The pedal 92 and the linkage elements between this pedal and the throw-out levers 81 of the main clutch 27 are advanced when this pedal is depressed and thus constitute means selectively operable responsively to advancive motion imparted thereto to release the main clutch. The lever 101, shaft 86a, fork 87a and the clutch throw-out bearing 89a constitute means operable by the main clutch releasing means attendant to advancive movement thereof to release the releasable connecting means 63 of the planetary gearing unit 13.

The lost motion connection 107—108 between the lock-up clutch operating lever 101 and the link 105 allows counterclockwise pivoting of the lever 101 by force imparted thereto through the interlock link 118 when the main clutch pedal 92 is depressed, without exerting rearward thrust through the link 105, which would shift the lever 102 rearwardly to the torque amplifying position wherein it would be latched by the detent means 115—116. Thus the main clutch operating pedal 92 can be operated without simultaneously changing the setting of the torque amplifier unit 13. The lost motion connection 121—122 between the lock-up clutch operating lever 101 and the interlock link 118 enables the torque amplifier control lever 102 to be operated between the direct drive and the torque amplifier positions without effecting disengagement of the main clutch 27.

Having thus described a single preferred embodiment of the invention with the view of clearly and concisely illustrating the same, we claim:

1. In an engine-driven vehicle; a frame; ground-engaging propelling means attached to said frame and operable from said engine; an engine-driven disengageable main friction clutch, a change-speed gearing unit drivable from said clutch when the latter is engaged, said gearing unit being in driving relation with the propelling means and including selectively meshable and demeshable relatively rotatable elements between which torsional force is transmitted during the transmission of power from the clutch to the ground-engaging propelling means while said elements are meshed, and a planetary gearing unit including a rotatable driving member driven from said clutch, a driven member rotatable coaxially with and relatively to the driving member and in driving relation with the change-speed gearing unit, a torque reaction member rotatable coaxially with and relatively to the driving and driven members, means for releasably connecting two of said members together for locking up the planetary gearing unit to cause rotation of all of such members in a forward direction about their coincident axes, and an overrunning-brake device disposed between the frame and said torque reaction member to accommodate such forward rotation thereof but operable to prevent retrograde rotation of such torque reaction member to adapt the planetary gearing unit for rotating the driven member at a speed differing from that of the driving member during release of the releasable connecting means from between said two members; means selectively operable responsively to advancive motion imparted thereto to release the main friction clutch; and means operable by the main clutch releasing means attendant to advancive movement thereof to release the releasable connecting means of the planetary gearing unit to terminate the lock-up of the planetary gearing unit whereby the driven element is free for retrograde rotation to preclude the existance of torsional pressure between the demeshable elements.

2. Power transmitting mechanism comprising a frame, a main clutch, a change speed transmission unit including demeshable torsional force transmitting elements which are respectively drive and driven elements, an auxiliary plural speed power transmission unit drivingly connected with the driving of said elements and including a one-way brake reactable against the frame to prevent retrograde rotation of the demeshable driving element while such auxiliary transmission is in one speed transmitting connection, the auxiliary transmission also including and being placeable in another speed transmitting connection which facilitates such retrograde rotation, means operable at will, for disengaging said clutch, and means operable by the clutch disengaging means attendant to such operation thereof to place the auxiliary transmission in the other speed connection.

3. Power transmitting mechanism comprising a frame, a main clutch, a change speed transmission unit including demeshable torsional force transmitting elements which are respectively drive and driven elements, an auxiliary plural speed power transmission unit drivingly connected with the driving of said elements and including a one-way brake reactable against the frame to prevent retrograde rotation of the demeshable driving element while such auxiliary transmission is in one speed transmitting connection, said one speed transmitting connection being disruptable to facilitate such retrograde rotation, a first means operable at will for disrupting such one speed transmitting connection means operable at will for disengaging said clutch, and means operable by the clutch disengaging means attendant to such operation thereof to operate said first means for also disrupting the one speed transmitting connection of the auxiliary transmission.

4. Power transmitting mechanism comprising a frame; a main clutch; a change-speed transmission unit including demeshable torsional force transmitting elements which are respectively drive and driven elements; an auxiliary power transmission unit drivingly connected between said clutch and the driving of said demeshable elements and including a reactive force train wherein there is a one-way brake reactable against the frame to prevent retrograde rotation of such demeshable elements during such connection of the auxiliary power transmission unit between such elements and the clutch, said reactive force train being disruptable to facilitate such retrograde rotation of the demeshable driving element; a first means operable at will for disrupting said force reactive train; means operable at will for disengaging said main clutch; and means operable by the clutch disengaging means attendant to such operation thereof to operate said first means for also disrupting the reactive force train.

5. Power transmitting mechanism comprising a frame; a main clutch; a change-speed transmission unit including demeshable torsional force transmitting elements which are respectively drive and driven elements, a planetary gearing unit including a driving member in driven relation with the main clutch, a driven member in driving relation with the driving of said demeshable elements, a torque reaction member, a lock-up clutch disengageably connectible between two of said members to lock up such gearing unit and thus make it operable to transmit power at one speed from the main clutch to the demeshable driving element, and a one-way brake reactable between the torque reaction member and the frame to make the gearing unit operable during disengagement of the lock-up clutch to transmit power at another speed from the main clutch to the demeshable driving element; a reactive force train including the one-way brake and reactable through the lock-up gearing unit and said brake against the frame to preclude retrograde rotation of the demeshable driving element, said reactive force train being disruptable to facilitate such retrograde rotation of the demeshable driving element; a first means operable at will for disrupting the reactive force train; means operable at will for disengaging said main clutch; and means operable by the clutch disengaging means attendant to such operation thereof to operate said first means for also disrupting the reactive force train.

6. The combination set forth in claim 5, wherein the means operable to disrupt the reactive force train includes said lock-up clutch.

7. Power transmitting mechanism comprising a frame; a main clutch; a change-speed transmission unit including demeshable torsional force transmitting elements which are respectively drive and driven elements; a planetary gearing unit including a driving member in driven relation with the main clutch, a driven member in driving relation with the driving of said demeshable elements, a torque reaction member, a lock-up clutch disengageably connectible between two of said members to lock up such gearing unit and thus make it operable to transmit power at one speed from the main clutch to the demeshable driving element, and a one-way brake reactable between the torque reaction member and the frame to make the gearing unit operable during disengagement of the lock-up clutch to transmit power at another speed from the main clutch to the demeshable driving element; a reactive force train including said lock-up clutch and the one-way brake and reactable through the locked-up gearing unit and said brake against the frame to preclude retrograde rotation of the demeshable driving element, said reactive force train being disruptable by disengagement of the lock-up clutch to facilitate such retrograde rotation of the demeshable driving element; a pivotal main clutch operating lever normally retracted to cause engagement of the main clutch; a main clutch operating linkage through which force is transmittable to the main clutch lever to pivot the same into an advanced position causing disengagement of the main clutch; a pivotal lock-up clutch operating lever normally retracted to cause engagement of the lock-up clutch; a manually operated lock-up clutch control lever rockable between advanced and retracted positions; a lock-up clutch operating linkage through which force is transmittable from the manual lever to the lock-up lever to pivot the same into an advanced position causing disengagement of the lock-up clutch pursuant to rocking of the manual lever into its advanced position; and an inter-lock linkage disposed between said levers and including lost-motion elements facilitating pivoting of the lock-up clutch lever to the advanced position without imparting pivoting motion to the main clutch lever that would place it in the advanced position, but such lost-motion elements being operable pursuant to advance of the main clutch lever to cause the inter-lock linkage to pivot the lock-up clutch operating lever into the advanced position for disengaging the lock-up clutch, and the lock-up clutch linkage including lost-motion elements facilitating such pivotal advance of the lock-up lever by the inter-lock linkage without imparting advance motion to the manually operated lever.

References Cited in the file of this patent
UNITED STATES PATENTS

| | | |
|---|---|---|
| Re. 22,312 | Banker | May 18, 1943 |
| 2,115,212 | Padgett | Apr. 26, 1938 |
| 2,533,610 | Norelius | Dec. 12, 1950 |
| 2,605,650 | Winther et al. | Aug. 5, 1952 |

FOREIGN PATENTS

| | | |
|---|---|---|
| 448,356 | Great Britain | June 18, 1936 |